(No Model.)

D. HALLUM.
SPITTOON.

No. 261,342. Patented July 18, 1882.

Witnesses
Walter Reese
H. S. Wilson

Inventor
David Hallum

UNITED STATES PATENT OFFICE.

DAVID HALLUM, OF EAST LIVERPOOL, OHIO.

SPITTOON.

SPECIFICATION forming part of Letters Patent No. 261,342, dated July 18, 1882.

Application filed June 15, 1882. (No model.)

*To all whom it may concern:*

Be it known that I, DAVID HALLUM, a citizen of the United States, residing at East Liverpool, in the county of Columbiana and State of Ohio, have invented a certain new and useful Improvement in Spittoons; and I do hereby declare the following to be a full, clear, and exact description thereof, reference being had to the drawings forming a part thereof.

My invention consists in an improvement in that class of spittoons which are composed of a basin and detachable inverted conical lid. The difficulty arising from the use of such spittoons is that in moving the spittoon around the lid is often pushed off onto the carpet, and the spittoon is sometimes upset and its contents spilled on the floor or carpet.

The object of my invention is to prevent these difficulties by the construction of a spittoon which will not spill its contents when turned on its side or upside down.

Figure 1:
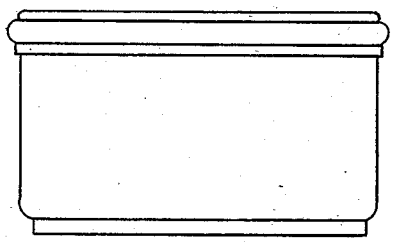
Figure 2:
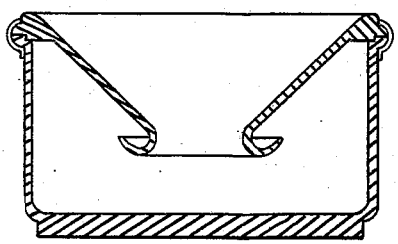
Figure 3:
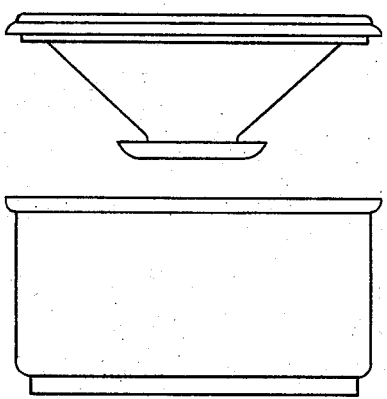
Figure 4:
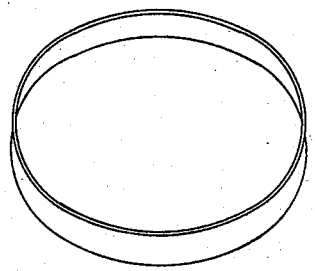

Figure 1 is a side view of my improved spittoon. Fig. 2 is a sectional view of the same. Fig. 3 is a side view of my improved spittoon with the lid withdrawn. Fig. 4 is a view of the encircling rubber band.

My invention consists, first, in applying a rubber band over the joint where the lid fits onto the basin, so as to hold the lid tightly to the basin and prevent the fluid contents from running out when the spittoon is placed on its side or turned upside down.

The second feature of my invention is in curving the lower end of the lid, so that when the vessel is turned upside down the fluid will not splash over the opening of the funnel, but will strike the curve and be thrown back, and thus prevent any leakage of the fluid.

The spittoons may be made of earthenware or metal covered with any non-corrosive matter, or any other suitable material. The rubber band should be about one inch wide and of about an eighth of an inch in thickness, and of such diameter that when placed over the joint its tension will not only hold the lid tight, but will also prevent any of the fluid contents from escaping when the spittoon is turned on its side or upside down.

The advantages of my improved spittoon are, first, that the lid and basin are held firmly together by a fluid-tight joint and leakage is prevented between the lid and the basin; second, the bottom of the lid-funnel being turned inward to the basin, the splash is prevented from escaping out of the funnel of the lid when the spittoon is turned upside down suddenly; third, the vessel, if made of earthenware, will be more durable, as the rubber band will act as a cushion to protect it from concussion when it is roughly handled; fourth, the band may be easily withdrawn when the spittoon is to be cleaned; fifth, my improved spittoon may be rolled on its side or turned upside down without losing a particle of its fluid contents.

What I claim as my invention, and wish to secure by Letters Patent, is—

1. A spittoon composed of a basin and a funneled lid, and provided with a rubber band encircling the joint between the basin and the lid, whereby the lid is firmly held to the basin by a fluid-tight joint, substantially as and for the purpose set forth.

2. A spittoon composed of a basin and a detachable funnel-lid, forming a curve at the apex of the funnel of the lid, whereby the splash of the fluid from a rough movement of the vessel will be thrown back and be prevented from escaping out of the mouth of the funnel, substantially as and for the purpose set forth.

3. As a new article of manufacture, a spittoon composed of a basin and a funnel-shaped detachable lid, and provided with a fluid-tight rubber joint uniting the two sections.

DAVID HALLUM.

Witnesses:
F. M. REESE,
H. L. REESE.